US007262420B1

(12) United States Patent
MacLeod et al.

(10) Patent No.: US 7,262,420 B1
(45) Date of Patent: Aug. 28, 2007

(54) SECURE TAG VALIDATION

(75) Inventors: Roderick W. MacLeod, Glenfarg (GB); Gary A. Ross, Edinburgh (GB)

(73) Assignee: NCR Corporation, Dayton, OH (US)

( * ) Notice: Subject to any disclaimer, the term of this patent is extended or adjusted under 35 U.S.C. 154(b) by 61 days.

(21) Appl. No.: 11/367,973

(22) Filed: Mar. 3, 2006

(51) Int. Cl.
*G01N 21/64* (2006.01)

(52) U.S. Cl. .................................................. 250/458.1

(58) Field of Classification Search ............ 250/458.1; 283/72
See application file for complete search history.

(56) References Cited

U.S. PATENT DOCUMENTS 7,067,824 B2 * 6/2006 Muller et al. ............ 250/458.1
2007/0108392 A1 * 5/2007 Ross ....................... 250/458.1

* cited by examiner

*Primary Examiner*—David Porta
*Assistant Examiner*—Marcus H Taningco

(57) ABSTRACT

A reader for validating a secure tag. The reader comprises: an optical source operable to illuminate the secure tag; a processor coupled to the optical source and operable to activate and de-activate the optical source; and a luminescence detector coupled to the processor and operable to measure a luminescence spectrum after a time delay has elapsed. The time delay may be based on a number generated by the reader in a random or pseudo-random manner, or it may be received across a network from a remote server. The processor is operable to accessing the time delay and to derive a luminescence signature from a luminescence spectrum measured by the luminescence detector. The processor is then operable to create a control signature using the time delay, to compare the derived luminescence signature with the control signature, and to validate the secure tag in the event of a match.

14 Claims, 4 Drawing Sheets

FIG. 2

| SECURE TAG TYPE | EXCITATION (nm) | LUMINESCENCE (nm) | DECAY TIME (HALF) (ms) | DECAY TIME (FULL) (ms) |
|---|---|---|---|---|
| 3mol% EUROPIUM | 395 | 535 | 2.1 | 7 |
| | | 590.5 | 2.1 | 7 |
| | | 615 | 2.1 | 7 |
| 3mol% DYSPROSIUM | 395 | 483 | 7 | 15 |
| | | 576 | 7 | 15 |

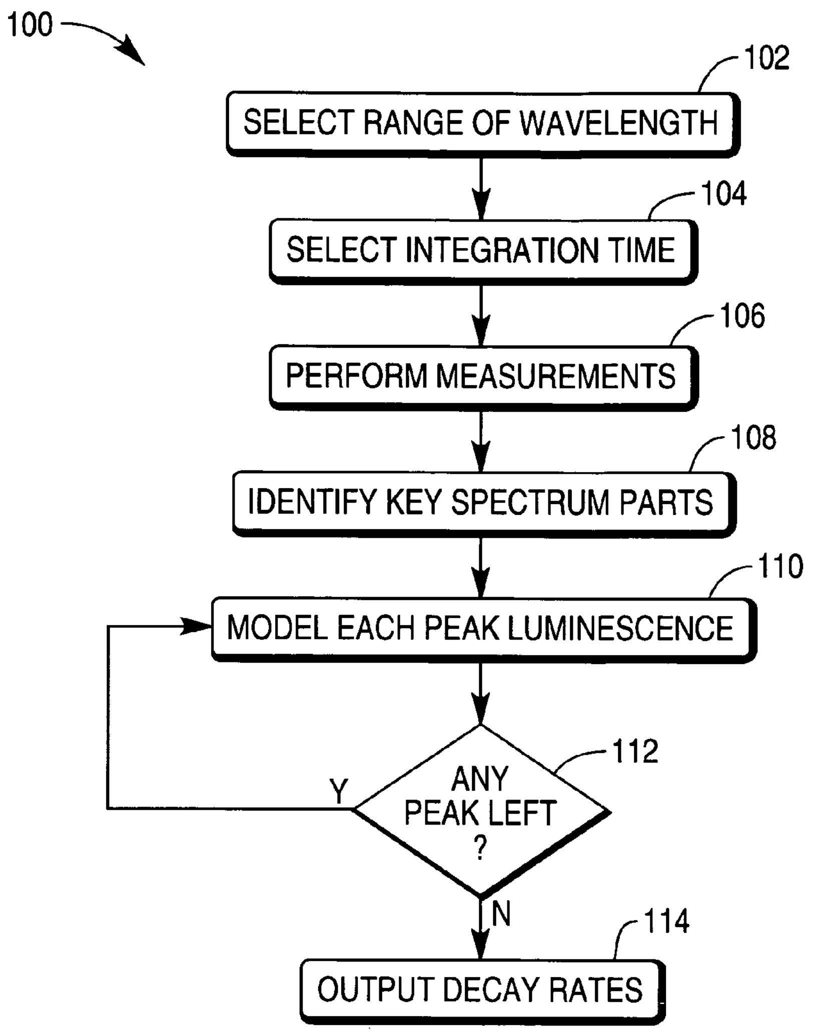
FIG. 3
FIG. 4
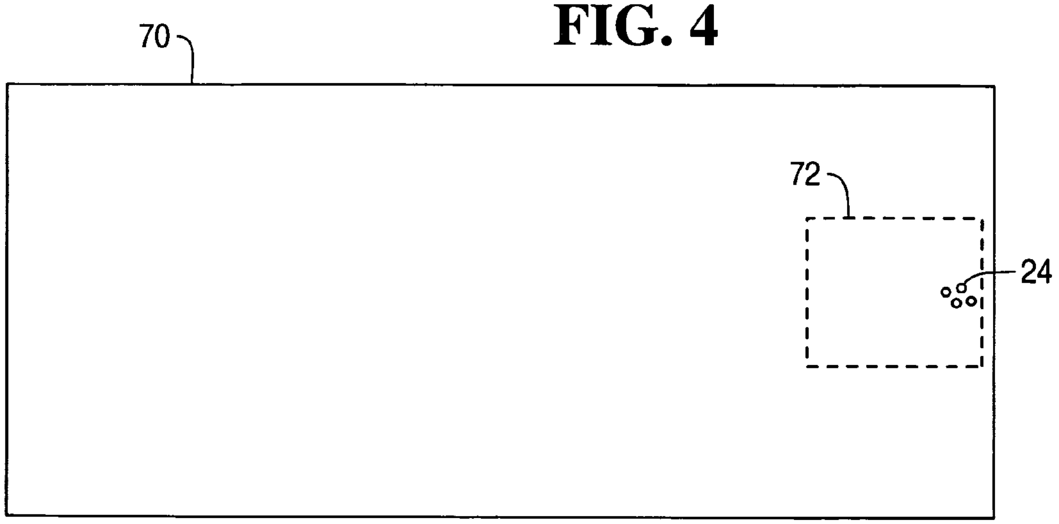

SECURE TAG VALIDATION

The present invention relates to secure tag validation.

BACKGROUND

Secure tags are used for a number of different purposes; a primary purpose being preventing, detecting, and/or deterring counterfeiting of an item to which the secure tags are affixed.

One type of secure tag that has recently been developed is based on small particles of a rare earth doped host, such as glass. This type of secure tag is described in U.S. patent application No. 2004/0262547, entitled "Security Labelling," and U.S. patent application No. 2005/0143249, entitled "Security Labels which are Difficult to Counterfeit", both of which are incorporated herein by reference.

These rare earth doped particles (hereinafter "RE particles") can be applied to valuable items in different ways. For example, the secure tags can be incorporated in fluids which are applied (by printing, spraying, painting, or such like) to valuable items, or incorporated directly into a substrate (paper, metal, rag, plastic, or such like) of the valuable items.

In response to suitable excitation, RE particles produce a luminescence spectrum having narrow peaks because of the atomic (rather than molecular) transitions involved. Luminescence is a generic term that relates to a substance emitting optical radiation in response to excitation, and includes photoluminescence, such as fluorescence and phosphorescence.

Fluorescent materials (dyes and pigments) typically have a decay lifetime of $10^{-9}$ to $10^{-7}$ seconds (1 to 100 nanoseconds). The fluorescence disappears very quickly after excitation ceases. Thus, detecting fluorescence is typically performed simultaneously with excitation.

Phosphorescent materials (dyes and pigments) typically have a decay lifetime of $10^{-3}$ to 100 seconds. Although detecting phosphorescence can be done simultaneously with excitation, it is also possible to measure phosphorescence after the excitation is removed, thereby adding to the security of a phosphorescent secure tag.

One advantage of secure tags based on RE particles is that luminescence from these RE particles persists for a relatively long period of time after an excitation source is removed; that is, the luminescence decay time is similar to that of phosphorescent materials. This enables a luminescence detector to include a delay between excitation and detection so that background fluorescence decays prior to the luminescence from the RE particles being detected.

To enable quick and accurate validation of a secure tag, a luminescence signature is derived from the luminescence measured from that secure tag. This luminescence signature may be based on peak locations, absence of peaks, relative peak intensities, and such like. A luminescence signature is typically derived by converting a large number of data points from a luminescence spectrum into a relatively short code. This short code (the luminescence signature) enables rapid comparison with other, pre-stored luminescence signatures to facilitate validation of the secure tag.

It would be desirable to increase the security of secure tags based on RE particles to make them even more difficult to counterfeit, without making validation of the RE particles slower or more expensive.

SUMMARY

According to a first aspect of the present invention there is provided a secure tag validation method comprising: exciting the secure tag; accessing a time delay; measuring a luminescence spectrum after elapse of the accessed time delay; deriving a luminescence signature from the measured luminescence spectrum; creating a control signature using the accessed time delay; comparing the derived luminescence signature with the control signature; ascertaining if the derived luminescence signature matches the control signature; and validating the secure tag in the event of a match.

The time delay may be pre-stored. Alternatively, a new time delay may be generated for each validation.

If the time delay is pre-stored, then it is preferably updated frequently (for example, via a network) so that a counterfeiter cannot ascertain the time delay.

If a new time delay is generated for each validation, then the new time delay may be generated in a manner that is random (for example, using hardware) or pseudo-random (for example, using software), that is, the new time delay is non-predetermined. Generating a new time delay for each validation has the advantage that it is very difficult for a counterfeiter to predict at what time the luminescence will be measured.

The time delay may be measured relative to when excitation starts (for example, if the excitation is a pulse lasting for a known amount of time), when excitation ceases, a preset time after excitation starts or ceases, or such like.

The time delay may be constrained between a minimum value (for example, 100 nanoseconds) and a maximum value (for example, 10 milliseconds). The time delay may also be constrained to a predetermined step size (for example, 100 nanoseconds), so that the generated time delay is rounded to the nearest complete step; alternatively, no rounding may be used.

Creating a control signature using the accessed time delay is not the same as reading a pre-stored control signature. Creating a control signature involves using the accessed time delay as an input to a function that operates on the accessed time delay to generate the control signature. The function may be a calculation (such as an equation or an algorithm), an expert system (such as an artificial neural network or a fuzzy logic system), or any other convenient numerical method.

The function may model the luminescence from the secure tag over time, so that for any given time the function provides the luminescence intensity at each of multiple wavelengths. A control signature can then be derived by applying an algorithm to the output of this function. For example, if the luminescence signature is the relative intensities of three different peaks, then the algorithm can identify those peaks and calculate the relative intensities. In such a system, creating the control signature is a two stage process: the first stage being to ascertain the intensity and wavelength information for a given time delay; the second stage being to create a control signature from this intensity and wavelength information.

As an alternative to modelling the luminescence from the secure tag over time, the function may model the luminescence signature over time. This has the advantage that creating the control signature is a single stage process rather than a two stage process; however, it has the disadvantage that the luminescence intensity at each of multiple wavelengths is not available, if required for other purposes.

Where the function models the luminescence from the secure tag over time, the function can be relatively simple because the luminescence decays according to an exponential equation of the form:

$$\text{Amplitude at time } y(A_y)=\text{Initial Amplitude}(A_i)\times\text{Exp}(-Rt_y)$$

Where R is a decay rate for that wavelength. Once R has been determined, Ay can be calculated for any value of y.

Where multiple rare earth ions contribute to luminescence at one particular wavelength, then the luminescence intensity at that wavelength will be the sum of multiple different exponential equations.

Ascertaining if the derived luminescence signature matches the control signature may comprise ascertaining whether the derived luminescence signature differs from the control signature by less than a predetermined amount (for example, a five percent difference). In other words, the derived luminescence signature may match the control signature even if there is a relatively small difference between them. This has the advantage of compensating for a change in luminescence resulting from electrical, optical, or thermal noise. Of course, the predetermined amount may be essentially zero, so that a perfect match is required. To make this feasible, digitization error correction techniques (which are well known in the art) may be used to ensure that the correct luminescence signature is always derived from a luminescence spectrum.

Prior to the step of validating the secure tag in the event of a match, the method may include exciting the secure tag again; accessing a new time delay; measuring a luminescence spectrum after elapse of the new time delay; deriving a luminescence signature from the measured luminescence spectrum; creating a control signature using the new time delay; comparing the derived luminescence signature with the control signature; ascertaining if the derived luminescence signature matches the control signature; and validating the secure tag in the event of a match between the derived luminescence signature and the control signature for both the first time delay and the new time delay. This has the advantage that a secure tag can be tested at two (or more) different time delays before the secure tag is validated; thereby increasing the probability that the secure tag being tested is genuine.

A constant integration time (the length of time over which the detector measures the luminescence) may be used; or the integration time may be variable. The total measured luminescence over this integration time may be used, or the average of a number of instantaneous luminescence measurements may be used.

Where the integration time is relatively long (of the order of microseconds), the luminescence spectrum changes over the integration time, which means that the luminescence measured over that time will be the sum of the luminescence emitted during that time. As a result, the created control signature may require summation of the luminescence at multiple different times during the integration time. Typically, the greater the number of discrete luminescence values that are summed, the greater the accuracy of the created control signature.

To achieve a stronger signal, the method may involve taking multiple measurements at the same delay time before a secure tag is validated. For example, a secure tag may be excited, a time delay elapses, the luminescence is measured, the secure tag is then immediately excited again, the same time delay elapses, the luminescence is measured again, and so on. The multiple measurements (all at the same delay time) are then combined. Although this increase the length of time required to validate a secure tag, it ensures that a short integration time can be used for each measurement.

By virtue of this aspect of the invention, a different time delay can be used each time a secure tag is validated, without requiring a pre-stored control signature for each time delay, because the control signature can be derived using the time delay. Varying the time at which a luminescence spectrum is measured forces a counterfeit tag to replicate the luminescence spectrum of the genuine secure tag, not just at one instantaneous time, but over the whole luminescence decay period, which is a much more difficult task.

This aspect of the invention has the advantage of added flexibility and reduced storage space because a luminescence signature can be created (calculated and/or modelled) based on a time delay as an input, without having to store thousands of different luminescence signatures.

According to a second aspect of the invention there is provided a device for validating a secure tag, the device comprising: an optical source; a processor coupled to the optical source; and a luminescence detector coupled to the processor; the processor being operable (i) to control activation and de-activation of the optical source, (ii) to access a time delay, (iii) to receive a measured luminescence spectrum from the detector after elapse of the accessed time delay, (iv) to derive a luminescence signature from the measured luminescence spectrum, (vi) to create a control signature using the accessed time delay, (vii) to compare the derived luminescence signature with the created control signature, (viii) to ascertain if the derived luminescence signature matches the created control signature; and (ix) to validate the secure tag in the event of a match.

The device may include a network connection to receive an updated time delay.

The device may include a number generator, either in the form of software or hardware, for providing the time delay.

According to a third aspect of the invention there is provided a reader for validating a secure tag, the reader comprising: an optical source operable to illuminate the secure tag; a processor coupled to the optical source and operable to activate and de-activate the optical source; and a luminescence detector coupled to the processor and operable to measure a luminescence spectrum after a time delay has elapsed; the processor being operable to create a control signature using the time delay and to validate the secure tag in the event that a predetermined acceptance criterion is met.

The acceptance criterion may require only a single condition to be fulfilled or it may require multiple conditions to be fulfilled.

The acceptance criterion may comprise the control signature matching a signature derived from the measured luminescence.

According to a fourth aspect of the present invention there is provided a secure tag validation method comprising: exciting the secure tag; generating a random or pseudo-random time delay; measuring a luminescence spectrum after elapse of the random or pseudo-random time delay; deriving a luminescence signature from the measured luminescence spectrum; creating a control signature using the random or pseudo-random time delay; comparing the derived luminescence signature with the control signature; ascertaining if the derived luminescence signature matches the control signature; and validating the secure tag in the event of a match.

The time delay may be generated by hardware (true random), or by software (pseudo-random).

The random or pseudo-random time delay may be measured relative to when excitation starts (for example, if the excitation is a pulse lasting for a known amount of time), when excitation ceases, a preset time after excitation starts or ceases, or such like.

In typical embodiments, it is desirable to ensure that excitation has ceased before a luminescence spectrum is measured. If the random or pseudo-random time delay is measured relative to when excitation ceases or relative to a preset time after excitation starts, then the excitation will always have ceased prior to the measurement being taken. However, if the random or pseudo-random time delay is measured relative to when excitation starts, then a certain minimum value of random or pseudo-random time delay may be desirable. Furthermore, it is desirable that background fluorescence is allowed to decay to noise levels before a luminescence measurement is taken. It may therefore be desirable to set a minimum value of random or pseudo-random time delay to ensure that sufficient delay is provided to allow background fluorescence to decay to noise levels. If the time delay is measured relative to when excitation ceases, then the minimum value of time delay may be, for example, 100 nanoseconds.

Preferably, the random or pseudo-random time delay is less than or equal to a maximum value. This is because it is important that the luminescence spectrum is measured before luminescence from the secure tag has decayed to noise levels. The maximum value may depend on the decay time of the secure tag being validated. For secure tags based on RE particles, the maximum decay time may be of the order of a few milliseconds.

The random or pseudo-random decay time may have a minimum value of 100 nanoseconds and maximum value of 10 milliseconds.

Ascertaining if the derived luminescence signature matches the control signature may comprise ascertaining whether the derived luminescence signature differs from the control signature by less than a predetermined amount (for example, a five percent difference). In other words, the derived luminescence signature may match the control signature even if there is a relatively small difference between them.

Creating a control signature may comprise (i) calculating luminescence values at multiple points in time starting with the time delay and finishing at a time equal to the time delay plus the integration time, (ii) integrating the luminescence values, and (iii) processing the integrated luminescence values to create a control signature.

By virtue of this aspect of the invention, it is very difficult for a counterfeiter to know at what delay time the luminescence from a counterfeit secure tag will be measured, thereby ensuring that a counterfeit tag must match the decay characteristics of the genuine tag being counterfeited to guarantee validation.

These and other aspects of the present invention will be apparent from the following specific description, given by way of example, with reference to the accompanying drawings.

BRIEF DESCRIPTION OF THE DRAWINGS

In the accompanying drawings:

FIG. 2 is a table illustrating the luminescence decay time for luminescence peaks from two different types of rare earth ions (Europium and Dysprosium);

FIG. 3 is a flowchart illustrating steps involved in creating a model of the luminescence decay of a secure tag including the two different types of rare earth ions of FIG. 2;

FIG. 4 is a schematic diagram of a banknote incorporating a secure tag for validation by the reader of FIG. 1.

DETAILED DESCRIPTION

Figure 1:
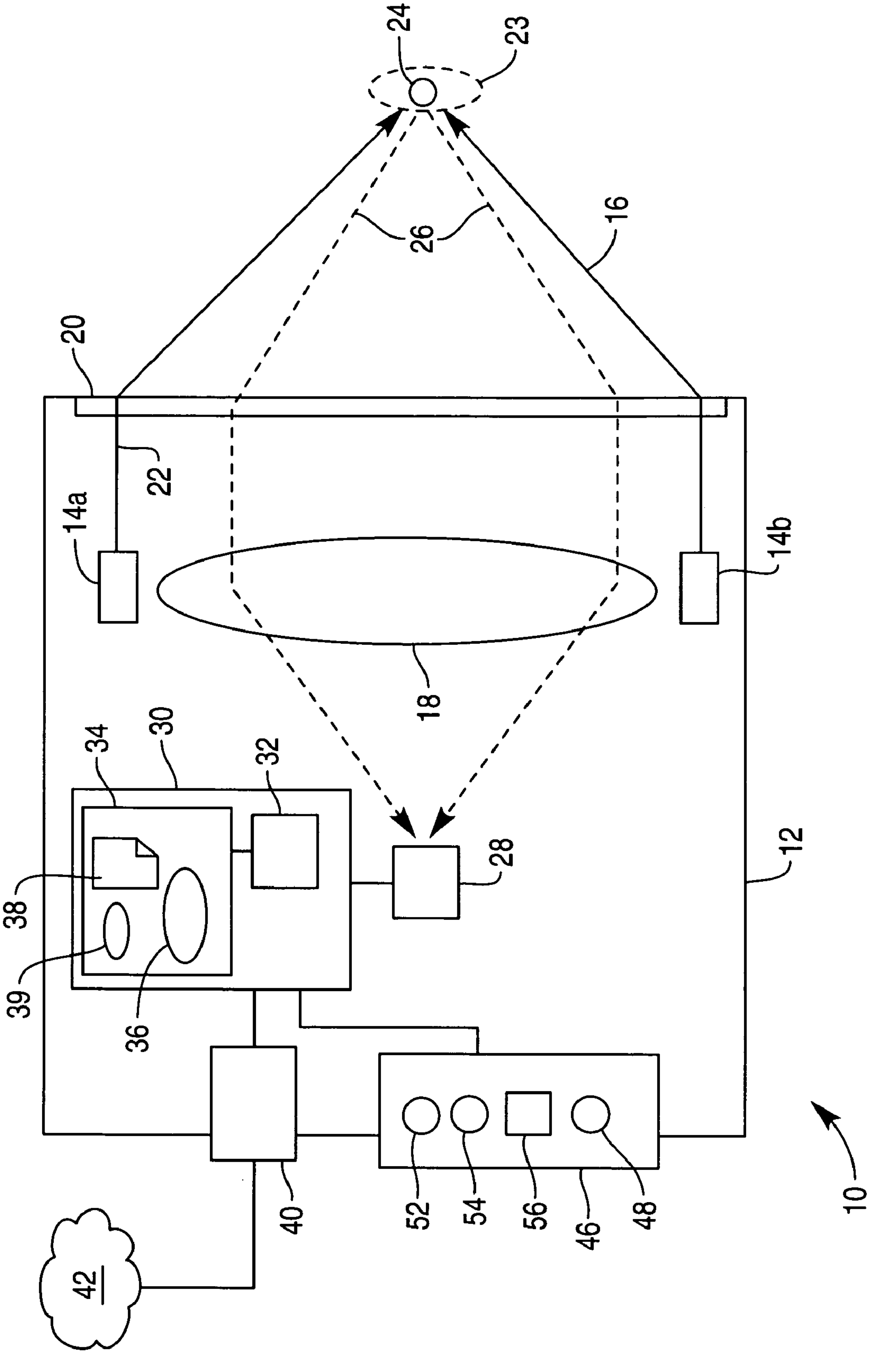
FIG. 1 is a schematic diagram of a secure tag reader according to one embodiment of the present invention.

Reference is first made to FIG. 1, which is a schematic diagram of a secure tag reader 10 according to one embodiment of the present invention.

The reader 10 is a hand-held unit and comprises a housing 12 in which an excitation source 14 is mounted. The excitation source 14 is in the form of a pair of LEDs circumferentially spaced around a collecting lens 18, diametrically opposite each other. The LEDs emit at approximately 395 nm, which is visible to the human eye and corresponds to the deep blue region of the electromagnetic spectrum.

A Fresnel lens 20 is mounted at a window in the housing 12 to focus radiation (illustrated by arrows 22) from the excitation source 14 onto a focus spot (illustrated by broken line 23) at which a group of secure tags 24 will be located.

Luminescence emitted from the secure tags 24 (illustrated by broken arrows 26) is directed by the Fresnel lens 20 onto the collecting lens 18, which in turn focuses the luminescence onto a luminescence detector 28, which is an imaging sensor in the form of a CCD sensor.

The CCD sensor 28 is coupled to a controller 30, comprising a processor 32 and non-volatile memory (NVRAM) 34.

The processor 32 receives intensity data from the CCD sensor 28 and processes this data to validate the secure tags 24, as will be described in more detail below.

The NVRAM 34 stores: a processing algorithm 36 that is used by the processor 32 to derive and create luminescence signatures, a decay rate information file 38 (which includes integration time information), and a number generator routine 39 (which generates a pseudo-random number).

The controller 30 controls activation of the excitation source 14 and also activation of the CCD sensor 28, so that the sensor 28 detects luminescence when activated by the controller 30 (the sensor 28 may actually detect luminescence continually but the processor 32 may only receive (or only store) the detected luminescence when the CCD sensor 28 is "activated"). The controller 30 uses the number generator routine 39 to determine when to activate the CCD sensor 28, and the decay rate information file 38 to ascertain the length of time during which the CCD sensor 28 should be activated.

The processor 32 uses the processing algorithm 36 to derive a luminescence signature from luminescence detected by the CCD sensor 28 and to create a control signature using the decay rate information file 38.

The controller 30 is coupled to a USB port 40 for outputting data, or the results of analysis on the data, and (in some embodiments) for receiving updated decay rate information from a remote source via a network 42.

The reader 10 also includes a simple user interface 46 coupled to the controller 30. The user interface 46 comprises: a trigger 48, which allows a user to activate the reader 10; a red LED 52, which indicates a failure to validate a secure tag; a green LED 54, which indicates a successfully validated secure tag; and a loudspeaker 56, which emits a short beep when a secure tag is successfully validated, and a long beep when a secure tag is not successfully validated.

In this embodiment, the reader 10 is intended to read secure tags 24 comprising microbeads of borosilicate glass doped with 3 mol % of Europium and 3 mol % of Dysprosium. The principles of manufacturing borosilicate glass doped with Europium and Dysprosium are described in U.S. patent application No. 2005/0143249, entitled "Security Labels which are Difficult to Counterfeit".

The decay of luminescence intensity over time varies between different rare earth ions. FIG. 2 is a table illustrating the decay times for a secure tag consisting of borosilicate glass doped with 3 mol % of Europium; and the decay times for a secure tag consisting of borosilicate glass doped with 3 mol % of Dysprosium. For each rare earth ion, the table shows the decay time for the instantaneous luminescence signal to reach half of the initial luminescence signal; and also the decay time for the instantaneous luminescence signal to decay to the background luminescence reading. FIG. 2 shows that the decay time for Dysprosium tags is more than double that for Europium tags. In FIG. 2, Eu-doped borosilicate glass tags have three luminescence peaks (at 535 nm, 590.5 nm, and 615 nm); whereas, Dy-doped borosilicate glass tags have two luminescence peaks (at 483 nm and 576 nm). There is no overlap between these five peaks because all five peaks are relatively narrow. Thus, a luminescence spectrum measured from a borosilicate glass secure tag doped with 3 mol % Eu and 3 mol % Dy has five luminescence peaks, three of which decay at a first rate, and two of which decay at a second rate. The two decay rates can be modelled independently because there is no overlap between the peaks.

Initially, a model is created to map the luminescence from the secure tags 24 against time, as will now be described with reference to FIG. 3, which is a flowchart illustrating the steps involved. The steps shown in FIG. 3 can be implemented using the reader 10, but would typically be implemented using a more accurate spectrometer arrangement such as those that are typically used in luminescence laboratories.

The first step (step 102) is to select a wavelength range for the luminescence spectrum. In this embodiment, the wavelength range of interest is from 400 nm to 790 nm, which covers almost all of the visible spectrum. The wavelength range is selected based on the location of peaks within the spectrum. If there are peaks in the infra-red region, then the wavelength range would reach into the infra-red.

An integration time is then selected (step 104), which represents the length of time over which a luminescence measurement will be recorded. In this embodiment, the integration time selected is 500 microseconds.

Measurements of the luminescence from the secure tags 24 in response to excitation from a source (having the same characteristics as excitation source 14) are then taken (step 106). The first measurement is taken for 500 microseconds (the integration time) immediately after the source is de-activated (that is, with a time delay of zero). The source is then activated again and the next measurement is taken (for 500 microseconds) a hundred microseconds after the source is de-activated (that is, with a time delay of a hundred microseconds). This is repeated, with the time delay incremented, until the time delay exceeds the luminescence decay time.

Steps 102 to 106 form the luminescence data acquisition stage. The next stage is to create a model for the luminescence data acquired.

Step 108 involves identifying those parts of the luminescence spectrum (referred to herein as the "key parts") that may be used to derive a luminescence signature. In this example, the key parts are the five peaks that will be used to derive a luminescence signature.

Step 110 involves modelling each peak individually to determine a best fit using a numerical method. In this embodiment, the numerical method is a simple exponential equation of the form:

$$A_y = A_i e^{(-Rt_y)}$$

where $A_y$ is the amplitude at time y, $A_i$ is the initial amplitude, R is a decay rate for that wavelength, and $t_y$ is time y. Once R has been calculated using the luminescence data for that wavelength, $A_y$ can be calculated for any value of time y ($t_y$).

If a peak cannot be modelled accurately using a simple exponential equation, then it may be the result of two or more transitions rather than a single transition. In such examples, an additional exponential equation is used (and the results of the two exponential equations are added) to try and model the peak. If this is unsuccessful then an additional exponential equation may be used, and so on, until the peak is accurately modelled.

Step 112 involves determining if any peaks remain to be modelled. If so, then step 110 is repeated for each remaining peak, until all peaks are modelled.

Once the modelling stage has been completed (that is, once all relevant peaks have been modelled), the process outputs (step 114) a decay rate (R) that has been calculated for each peak. In this example, the three peaks for Europium all have the same decay rate (R1), and the two peaks for Dysprosium all have the same decay rate (R2).

Once the decay rates have been calculated, they are loaded into the reader's NVRAM 34 as a new decay rate information file 38, together with the integration time information (500 microseconds). This may be performed either locally at the reader 10 or via the network 42 and USB port 40. The decay rate information file 38 contains information about the location (wavelength) of each peak of interest (that is, each peak that may be used to derive a luminescence signature) together with the decay rate for that peak, and the integration time used (which may be the same for all peaks or different for some peaks than others).

The particular luminescence signature algorithm that will be used is also loaded into the reader's NVRAM 34 as a new processing algorithm 36. Any convenient luminescence signature algorithm may be used; in this embodiment, the algorithm 36 identifies the peaks in the measured luminescence, normalizes the intensities of the identified peaks, compares the ratios of all of the peaks, and creates a unique code based on the peak ratios.

Once the processing algorithm 36 and the decay rate information file 38 have been updated (or loaded for the first time), the reader 10 is ready to validate secure tags 24.

Figure 5:
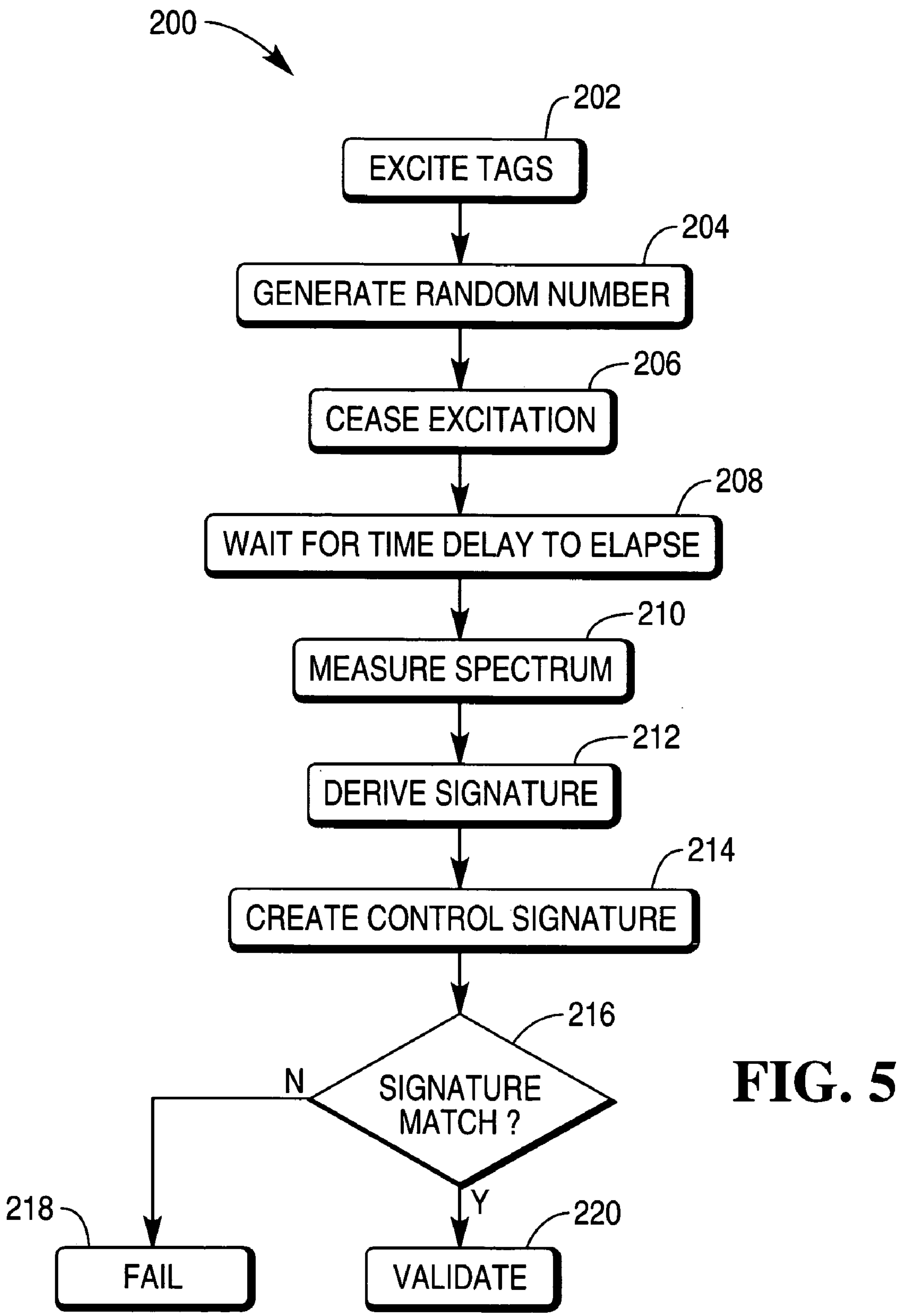
FIG. 5 is a flowchart illustrating steps involved in validating the banknote of FIG. 4 using the reader of FIG. 1 implementing the model created by the steps of FIG. 3.

Validation of secure tags 24 will now be described with reference to FIG. 4, which illustrates a valuable media item 70, in the form of a banknote, which is printed with ink incorporating secure tags 24 at a tag area 72 on the banknote 70. The tags 24 comprise small beads (typically having an average diameter of five microns or less) of borosilicate glass doped with 3 mol % of Dysprosium and 3 mol % of Europium. For clarity, in FIG. 4 the tags 24 are greatly enlarged with respect to the banknote 70, and only a few tags 24 are shown. Validation of secure tags 24 will also be described with reference to FIG. 5, which is a flowchart illustrating the steps performed by the reader 10 (but not necessarily in the order shown in FIG. 5).

When the banknote 70 is to be validated, the reader's focus spot 23 and the tag area 72 are aligned. This alignment is achieved either by moving the banknote 70 or by moving the reader 10, or both. This alignment may be performed manually, or by the controller 30 in embodiments where a motorized transport is used.

Once the reader 10 and banknote 70 are aligned, the user presses the trigger 48. On receipt of a trigger press, the controller 30 activates the LEDs 14 which illuminate the secure tags 24 (step 202) for a pre-determined length of time, in this embodiment five milliseconds (5 ms). The pre-determined length of time may be stored in the algorithm 36, the decay rate information file 38, or any other convenient location.

The controller 30 then accesses a time delay (step 204) during which luminescence from the secure tags 24 is not recorded. In this embodiment, the time delay is accessed by the processor 32 requesting the number generator routine 39 to provide a non-predetermined (in effect, a pseudo-random) number. The number generator routine 39 creates a random number and scales this number, then adds an offset (a minimum value) to this scaled random number to ensure that the time delay is constrained between the offset and a maximum value.

The controller 30 then de-activates the LEDs 14 (step 206), and waits for the generated time delay to elapse (step 208).

Once the time delay has elapsed, the controller 30 activates the CCD sensor 28 for a period of time corresponding to the integration time (500 microseconds) specified in the decay rate information file 38. The CCD sensor 28 measures luminescence from the secure tags 24 and any background radiation (step 210) during this integration time. The controller 30 integrates these measurements.

The controller 30 then derives a luminescence signature (step 212) of the measured luminescence spectrum from the secure tags 24 using the algorithm 36. As stated above, the algorithm 36 identifies the peaks in the measured luminescence, normalizes the intensities of the identified peaks, compares the ratios of all of the peaks, and creates a unique code based on the peak ratios. This unique code is the luminescence signature for the secure tags 24.

The next step is for the controller 30 to create a control signature (step 214) using the decay rate information (which models the luminescence decay of the secure tags 24) in decay rate information file 38. The controller 30 performs this by using the generated time delay as $t_y$ in the exponential equation $$A_y = A_i e^{(-Rt_y)}$$

and using the appropriate decay rate (R) for each peak. This yields an intensity for each peak. The controller 30 then applies the algorithm 36 to normalize the intensities of the identified peaks, compare the ratios of all of the peaks, and create a unique code based on the peak ratios (the created control signature).

The controller 30 then compares the created control signature with the luminescence signature derived from the secure tags 24 using the CCD sensor 28 (step 216). If the two signatures do not meet an acceptance criterion, for example, if the two signatures do not match (within a predetermined tolerance) then the secure tag 24 is not validated (step 218), and the controller 30 activates the red LED 52 and causes the loudspeaker 56 to emit a long beep.

If the two signatures do meet an acceptance criterion, for example, if the two signatures match (within a predetermined tolerance) then the secure tag 24 is validated (step 220), and the controller 30 activates the green LED 54 and causes the loudspeaker 56 to emit a short beep.

If greater confidence is required in the validity of the secure tags 24, then the reader 10 may use two different time delays before validating the secure tags 24. In effect, this would involve implementing process 200 twice, and only validating the secure tags 24 if the derived signature matched the created control signature on both occasions.

Various modifications may be made to the above described embodiment within the scope of the present invention, for example, in other embodiments a secure tag based on luminescent particles other than rare earth doped hosts may be used. Where rare earth doped hosts are used, more or fewer than two rare earth ions may be included in each secure tag. The rare earth ion or ions used may be different to Europium and Dysprosium. The rare earth ions may comprise lanthanide ions.

In other embodiments, a different numeric method to an exponential equation may be used. For example, a different equation may be used, or an expert system (neural network, fuzzy logic system, or such like) may be used. Software packages are available that can model a curve using linear and/or non-linear equations, and other mapping methods, so this process can be automated.

The process for calculating decay rates for the peaks may be implemented in an entirely automated manner, or there may be some manual selection.

In the above example, the three peaks for Europium all have the same decay rate (R1), and the two peaks for Dysprosium all have the same decay rate (R2); in other examples, each peak (or some peaks) may have a different decay rate to other peaks.

In the above embodiment, the time delay is accessed by the processor requesting the number generator routine to provide a random (in effect, a pseudo-random) number; whereas, in other embodiments, the time delay may be stored in the controller, and may be updated frequently via the network and the USB port. Where a random or pseudo-random number is generated, this number may be generated prior to a request being made for the number, or when the request is made (that is, in response to the request).

In the above embodiment, the key parts are all of the peaks in the wavelength range; in other embodiments, the key parts may be fewer than all of the peaks, and may include areas of the wavelength range that are not peaks, for example, areas of background noise, or areas part-way between a peak and background noise.

In other embodiments, a hardware random number generator may be used instead of or in addition to the number generator routine.

What is claimed is:

1. A secure tag validation method comprising:

exciting the secure tag;

accessing a time delay;

measuring a luminescence spectrum after elapse of the accessed time delay;

deriving a luminescence signature from the measured luminescence spectrum;

creating a control signature using the accessed time delay;

comparing the derived luminescence signature with the control signature;

ascertaining if the derived luminescence signature matches the control signature; and validating the secure tag in the event of a match.

2. The method of claim 1, wherein accessing a time delay further comprises generating a new time delay for each validation.

3. The method of claim 1, wherein the time delay is constrained between a minimum value and a maximum value.

4. The method of claim 1, wherein creating a control signature involves using the accessed time delay as an input to a function that operates on the accessed time delay to generate the control signature.

5. The method of claim 4, wherein the function is a calculation.

6. The method of claim 4, wherein the function models the luminescence from the secure tag over time, so that for any given time the function provides the luminescence intensity at each of multiple wavelengths.

7. The method of claim 4, wherein the function models the luminescence signature of the secure tag over time.

8. The method of claim 1, wherein ascertaining if the derived luminescence signature matches the control signature comprises ascertaining whether the derived luminescence signature differs from the control signature by less than a predetermined amount.

9. The method of claim 8, wherein the derived luminescence signature has to match the control signature perfectly.

10. A reader for validating a secure tag, the reader comprising:

an optical source operable to illuminate the secure tag;

a processor coupled to the optical source and operable to activate and de-activate the optical source; and a luminescence detector coupled to the processor and operable to measure a luminescence spectrum after a time delay has elapsed;

the processor being operable to create a control signature using the time delay and to validate the secure tag in the event that a predetermined acceptance criterion is met.

11. The reader of claim 10, wherein the predetermined acceptance criterion comprises: a luminescence signature derived from the measured luminescence spectrum matching the control signature.

12. The reader of claim 10, wherein the reader includes a network connection to receive an updated time delay.

13. The reader of claim 11, wherein the reader includes a number generator operable to generate a random or pseudo-random number.

14. A secure tag validation method comprising:

exciting the secure tag;

generating a random or pseudo-random time delay;

measuring a luminescence spectrum after elapse of the random or pseudo-random time delay;

deriving a luminescence signature from the measured luminescence spectrum;

creating a control signature using the random or pseudo-random time delay;

comparing the derived luminescence signature with the control signature;

ascertaining if the derived luminescence signature matches the control signature; and validating the secure tag in the event of a match.

* * * * *